US005625747A

United States Patent [19]
Goldberg et al.

[11] Patent Number: 5,625,747
[45] Date of Patent: Apr. 29, 1997

[54] SPEAKER VERIFICATION, SPEECH RECOGNITION AND CHANNEL NORMALIZATION THROUGH DYNAMIC TIME/FREQUENCY WARPING

[75] Inventors: Randy G. Goldberg, Princeton; Gerard P. Lynch, Wall; Richard R. Rosinski, Middletown, all of N.J.

[73] Assignee: Lucent Technologies Inc., Murray Hill, N.J.

[21] Appl. No.: 310,116

[22] Filed: Sep. 21, 1994

[51] Int. Cl.$^6$ ........................ G01L 5/06
[52] U.S. Cl. .................. 395/2.52; 395/2.4; 395/2.5; 395/2.47
[58] Field of Search ............... 395/2, 2.1, 2.11, 395/2.33, 2.41, 2.45, 2.5, 2.47, 2.52, 2.54–2.57, 2.59–2.62, 2.64–2.66; 381/4–43

[56] References Cited

U.S. PATENT DOCUMENTS

| | | | |
|---|---|---|---|
| 3,700,815 | 10/1972 | Doddington | 395/2.55 |
| 4,078,154 | 3/1978 | Suzuki et al. | 395/2.45 |
| 4,344,031 | 8/1982 | Kuhn et al. | 324/76.24 |
| 4,348,553 | 9/1982 | Baker et al. | 395/2.5 |
| 4,752,958 | 6/1988 | Cavazza et al. | 395/2.57 |
| 4,783,804 | 11/1988 | Juang et al. | 395/2.65 |
| 4,903,306 | 2/1990 | Nakamura | 395/2.56 |
| 4,926,488 | 5/1990 | Nadas et al. | 395/2.42 |
| 4,941,178 | 7/1990 | Chuang | 395/2.61 |
| 5,091,948 | 2/1992 | Kametani | 395/2.57 |
| 5,146,539 | 9/1992 | Doddington et al. | 395/2 |

*Primary Examiner*—Kee M. Tung

[57] ABSTRACT

A Dynamic Time/Frequency Warping (DTFW) technique is disclosed for speaker verification, speech recognition and channel normalization, among other uses. The DTFW technique utilities best path dynamic programming methods using a 3-dimensional time frequency array representing the spectral differences between a test utterance (the utterance being analyzed) and a reference utterance (template). The array is created by summing the squares of the differences of each feature in each frame of the template with each feature in each frame of the utterance in question. Dynamic programming techniques are then used to find the minimal distance path matching the test utterance and the template so as to optimize the time and frequency warping paths.

9 Claims, 4 Drawing Sheets

REF FEATURES

TEST FEATURES

DTW
WARPED FEATURES

DTFW
WARPED FEATURES

SPEAKER VERIFICATION, SPEECH RECOGNITION AND CHANNEL NORMALIZATION THROUGH DYNAMIC TIME/FREQUENCY WARPING

BACKGROUND OF THE INVENTION

1. Field of the Invention

This invention relates generally to acoustical signal analysis and, more particularly, to a system and method for verifying the identity of a person, recognizing speech or sounds, and/or normalizing communication channels through dynamic time/frequency warping.

2. Description of the Related Art

Speech or sound patterns may be represented by a set of measurements of acoustic features or spectral models. Such measurements of acoustic features or spectral models may be used for various purposes such as verifying the identity of a speaker, recognizing speech or speech patterns (i.e. "keyword spotting"), and normalizing channels through which acoustic signals are transmitted.

In general, different speakers will produce sounds having different spectral components. Accordingly, the size and shape of the vocal tract dictates location and band width of speech formats. In general, a phoneme spoken by the same person twice should have about the same spectral information. However, if the same phoneme is spoken by different people, the spectral information will be distorted due to differences in the size and shape of the two vocal tracts.

In the past, comparisons have been made between a reference utterance of a speaker with a test utterance of the speaker to determine whether or not the two utterances were spoken by the same individual. This is often referred to as speaker verification. Similarly, such comparisons have been used to recognize particular words (including "keyword spotting") spoken by any individual. This is often referred to as speech recognition. However, such comparisons in the past have been insufficient to achieve meaningful speaker verification and speech recognition.

In the past, such comparisons have been insufficient because of an inability to focus on the problems associated with analyses of such distorted spectral information. An utterance, which is to be recognized or verified, is generally more complex than steady sound. Therefore, speech patterns often involve sequences of short-time acoustic representations. Pattern comparison techniques for speech recognition and the speaker verification, therefore, must compare sequences of acoustic features. Problems associated with spatial sequence comparison for speech comes from the fact that different acoustic renditions of the same speech utterance, such as words, phrases or sentences, are seldom realized at the same temporal rate (speaking range) across the entire utterance. Therefore, when comparing different acoustic representations of the same utterance, speaking variations as well as duration variations should not contribute to the comparison of the test utterance to the reference utterance. Accordingly, there is a need to normalize speaking fluctuations in order for utterance comparison to yield proper speech recognition, speaker verification and/or channel normalization.

One well known and widely used statistical method of characterizing the spectral properties of the frames of a pattern is known as the hidden Markov model (HMM) approach. Another approach which has been widely used to determine pattern dissimilarity measurements is known as Dynamic Time Warping (DTW).

Essentially, DTW seeks to normalize time differences between the test utterance and the reference utterance so as to better align the two utterances in time for comparison. DTW uses dynamic programming optimization techniques to achieve some degree of enhanced temporal alignment.

Dynamic programming is an extensively studied and widely used tool in operations research for solving various decisional problems. In general, dynamic programming is used to arrive at an operable path and score (value) associated with sequential decisional problems. Such optimization techniques are often referred to as "the traveling salesman problem."

The DTW and HMM techniques, as well as the dynamic programming techniques, are described in greater detail in Rabiner, Lawrence et al., *Fundamentals of Speech Recognition*, Prentice Hall: New Jersey, 1993.

Time alignment using standard DTW methods, however, still fails to address proper alignment of the test and reference utterances to achieve accurate comparison of these utterances. In particular, when two utterances are spoken by different speakers, DTW methods have great difficulty in aligning speech due to spatial differences between the test and reference data in the frequency domain. Mismatches in time alignment create poor warping functions and therefore skew the data so as to impede meaningful comparison between the utterances. These errors in the resulting time-warped features are skewed in such a way so as to lead to the conclusion that two vocal tracts are more similar than they really are (due to minimization errors in the DTW algorithm). Accordingly, a speaker verification system could potentially grant access to impostors in view of these errors associated with DTW techniques. Moreover, such a speaker verification system could falsely reject users that should be granted access, particularly due to changing channel (e.g. telephone and telephone line) characteristics.

In the past, there have been various attempts to use both HMM and DTW for speaker verification. For example, in U.S. Pat. No. 3,700,815, an automatic speaker verification system using non-linear time alignment of acoustic parameters is disclosed. Similarly, in U.S. Pat. No. 4,344,031, a method and device for verifying signals, especially speech signals, is disclosed. However, these references fail to alleviate the problems associated with improper alignment resulting from DTW analysis.

A graphical representation of DTW analysis is presented in FIGS. 1A, 1B and 2. FIG. 1A is a graphical depiction of the features of a single reference utterance. As can be seen in FIG. 1A, such features are represented in a frequency versus time graph. Similarly, test features can be depicted graphically as shown in FIG. 1B. However, in view of the fact that there are time distortions between the test and reference utterances, DTW achieves some degree of alignment between the reference and test features to yield the warped features of FIG. 2. The warped features of FIG. 2 are achieved through the "stretching" and "shrinking" in time of features by DTW to make the test utterance best match the reference utterance. Once such DTW analysis is completed, the warped features can be compared to the reference features to achieve speaker verification, speech recognition, channel normalization, etc. However, as can be seen in FIG. 2, there are numerous mis-alignments in the frequency domain which are not properly addressed by DTW techniques.

Accordingly, DTW fails to achieve sufficient alignment of the reference features with the test features to achieve an accurate comparison between the reference utterance and the test utterance when the frequency characteristics of the features are not taken into account. Accordingly, significant errors may result from using DTW for speaker verification, speech recognition, etc. Accordingly, many have abandoned the use of DTW techniques in view of these difficulties.

SUMMARY OF THE INVENTION

The present invention achieves many advantages for efficiently comparing reference and test utterances in speaker verification, speech recognition, and channel normalization techniques. Advantages of the present invention include the ability to optimize speaker verification, speech recognition, and channel normalization through the alignment of test and reference utterances in both the frequency and time domains. In general, therefore, it is an advantage of the instant invention to simultaneously achieve optimum time warping paths and frequency warping paths. Accordingly, shifts in frequency due to differences in vocal tract size, other vocal tract irregularities, and channel characteristics are therefore minimized.

In accordance with these advantages, the present system provides a method of analyzing acoustic signals including the following steps: receiving acoustic signals, generating test acoustic parameter signals from the received acoustic signals, comparing the test acoustic parameter signals with reference acoustic parameter acoustic signals, warping the test acoustic parameter signals in the time and frequency domains, comparing the warped test acoustic parameter signals to a series of reference acoustic parameter signals, determining a difference between the warped acoustic parameter signals and the reference acoustic parameter signals, and comparing the difference to a predetermined threshold to achieve various results such as speaker verification, speech recognition, channel normalization, among others. Moreover, the aforementioned method may include the additional step of classifying the warped paths to determine whether frequency warping is due to channel differences or speaker differences.

The present acoustical analysis system is also directed to a structure for analyzing audio signals of a test phase to develop a set of acoustic parameter signals corresponding to each audio signal and a processing structure for processing the acoustic parameter signals in at least two coordinate frames. The system generates warped acoustic parameter signals from the acoustic parameter signals of a test phase to facilitate comparison with acoustic parameter signals of a reference phase. The two coordinate frames may include both the time and frequency domains.

These, together with other features and advantages which will be subsequently apparent, reside in the details of construction and operation as more fully hereinafter described and claimed, with reference being had to the accompanying drawings forming a part hereof, wherein like numerals refer to like elements throughout.

DETAILED DESCRIPTION OF A PREFERRED EMBODIMENT OF THE INSTANT INVENTION

In general, the Dynamic Time Frequency Warping Techniques (DTFW) of the instant invention uses best path dynamic programming (traveling salesman problem) methods through a three-dimensional time frequency array representing the spectral differences between a test and a reference utterance. This array is created by summing the squares of the difference of each feature in each frame of the reference utterance (template) with each feature in each frame of the test utterance in question (sample utterance), and then shifting the template in the frequency (feature) domain and performing the same calculations. Dynamic programming techniques are then used to find the minimal distance path matching the test utterance to the template. In this way, simultaneous optimum time warping paths and frequency warping paths are achieved. Hindrances in frequency shifts due to differences in vocal tract size, and other vocal tract irregularities, as well as channel irregularities, may be minimized in this matter.

Figure 1A:
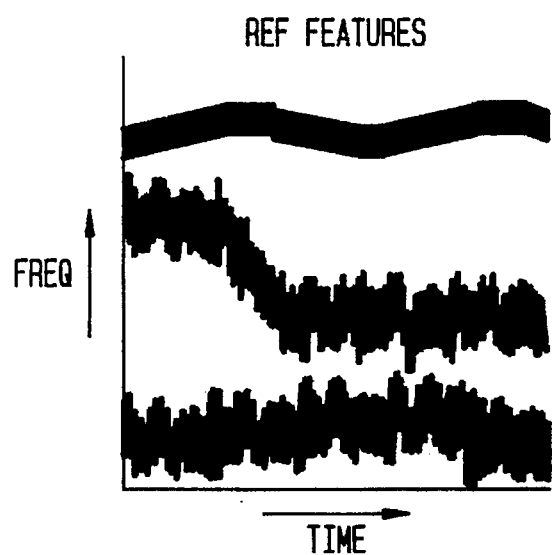
FIG. 1A is a graphical depiction of the acoustic parameter signals associated with the reference features of a single reference utterance.
Figure 2:
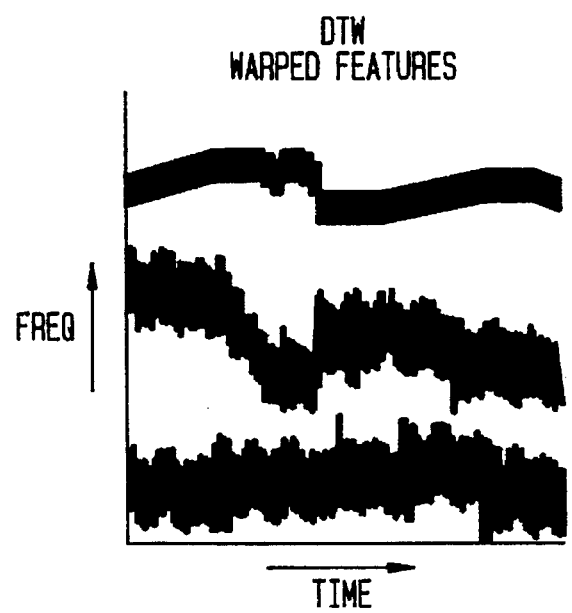
FIG. 2 is a graphical depiction of the warped features of a single utterance depicted in FIG. 1B after having been warped in the time domain through dynamic time warping (DTW) techniques.
Figure 3:
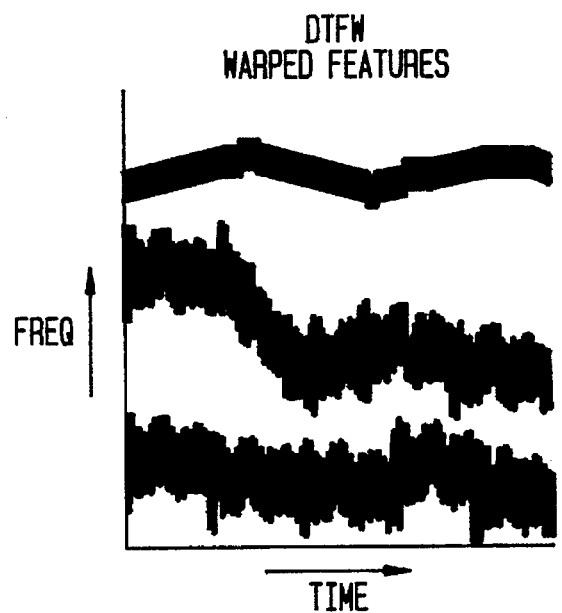
FIG. 3 is a graphical depiction of the warped features of the utterance depicted in FIG. 1B after having been warped in both the time and frequency domains using dynamic time frequency warping (DTFW) techniques.

A graphical depiction of the warped features of several test utterances having been warped through the dynamic time frequency warping techniques of the instant invention is shown in FIG. 3. As can be seen from a comparison of the DTFW warped features of FIG. 3 with the DTW features of FIG. 2, the DTFW features are in better alignment with the reference features of FIG. 1A so as to achieve more accurate comparison between the two utterances.

Figure 4:
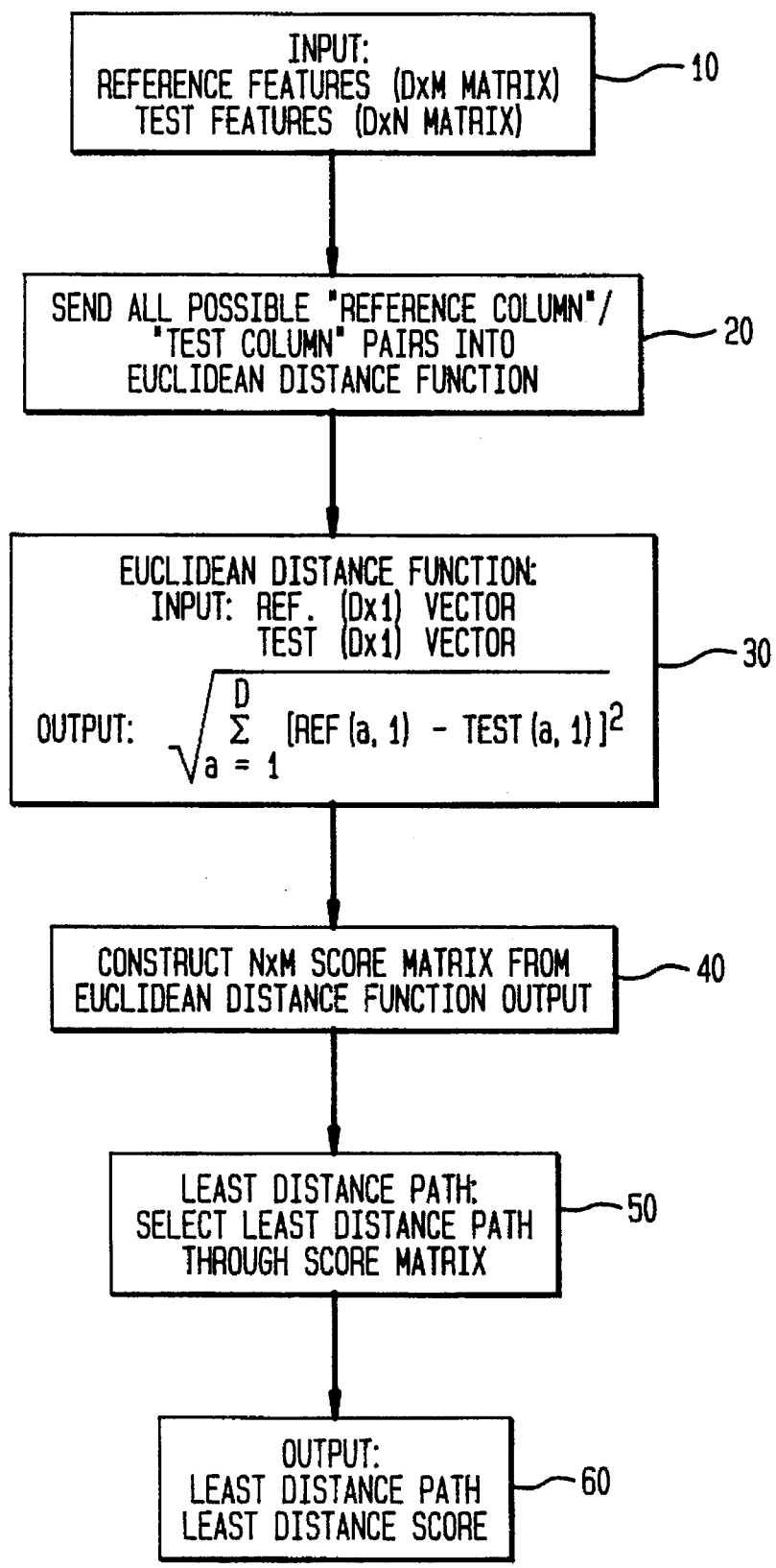
FIG. 4 is a flowchart illustrating the dynamic time warping technique.

FIG. 4 depicts a flow chart which represents the analysis conducted during dynamic time warping. In the first step of the dynamic time warping analysis, represented as reference numeral 10, the reference and test features of the reference and test utterances, respectively, are represented in matrix form. The reference features are inputed as a D×M matrix, where D represents the number of features associated with the utterance and M represents time. Similarly, the test features are enumerated in a D×N matrix. D represents the number of features associated with each frame (or segment) of the utterance.

In the preferred embodiment, linear predictive coding (LPC) features representing the LPC spectrum are utilized. However, other techniques including cepstrum, non-linear wavelet features, etc., may also be utilized. Moreover, in the preferred embodiment, 32 features are used, although it is to be understood that a different number of features may be used. Accordingly, in the preferred embodiment, D equals 32.

Furthermore, in a preferred embodiment of the present invention, a one second time frame is utilized (in other words, an utterance lasting one second). The number of segments, M or N, in which the utterance is divided, is equal to the length of time of the utterance divided by the duration of a particular segment minus any overlap between segments. In the preferred embodiment, each segment is equal to 20 ms (milliseconds). Moreover, in the preferred embodiment, there is a 10 ms overlap between each of the segments. Accordingly, for a one second time utterance there are 1/(0.02–0.01) or 100 time segments. Accordingly, in the preferred embodiment the D×M and D×N matrixes are 32×100 in dimension for a one second time utterance.

Although a one second time fame is utilized in the preferred embodiment of the present invention, comparisons may be made between a reference utterance and a test utterance having different durations. Preferably, however, such comparisons should be made with a test utterance that is within the range of one-half to double the duration of the reference utterance. In other words, time warps should preferably fall within the range of ½ and double speed. Similarly, frequency warps should preferably fall within a similar range of ½ to double the features. However, such an analysis must start at feature 1 in both the test and reference utterances and must end at feature D in both the test and reference utterances.

With continuing reference to FIG. 4, in the second step of the DTW flow chart, represented by reference numeral 20, the D×M and D×N matrixes are divided into reference and test columns of D×1 dimension. Accordingly, in the preferred embodiment, each of these columns is 32×1 in dimension. These reference columns and test columns are sent into the euclidian distance function of step 30.

In step 30, euclidian distance function measurements are determined between the reference and test D×1 columns. Euclidian distance function measurements are described in greater detail in Rabiner, Lawrence, *Fundamentals of Speech Recognition*, Prentice Hall: New Jersey, 1993.

From the euclidian distance function outputs of step 30, a N×M score matrix is constructed from the euclidian distance function output in step 40. From step 40, dynamic programming techniques are used to determine the least distance path through the N×M score matrix at step 50. Moreover, the least distance path and the least distance score are outputed at step 60. DTW techniques are described in greater detail in the Rabiner text described above. The least distance path and least distance score output is used to warp the test features to achieve warped test features, as graphically depicted in FIG. 2.

Figure 5:
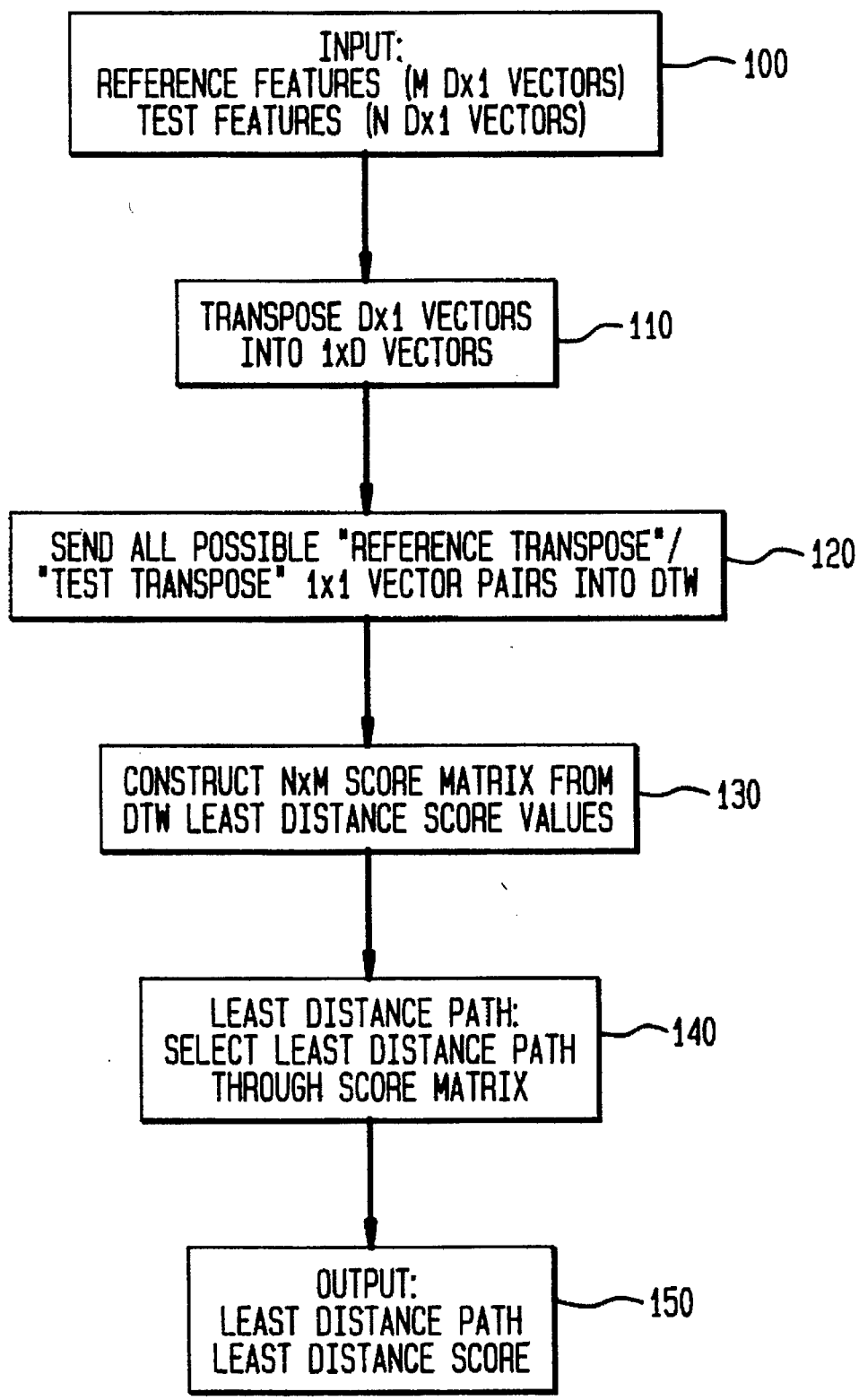
FIG. 5 is a flowchart depicting the dynamic time frequency warping techniques of the present invention.

FIG. 5 depicts the DTFW analysis of the instant invention to achieve the results as graphically depicted in FIG. 3. In step 100 of the DTFW analysis, M D×1 vectors are inputed from the reference features and N D×1 vectors are inputed from the test features. These vectors are, in step 110, transposed from D×1 vectors into 1×D vectors so as to place them in proper condition for euclidian distance measurement and DTW analysis.

At step 120, all of the 1×D vectors are first broken up into 1×1 vector pairs which are sent into the DTW analysis. Although 1×1 vector pairs are used so as to fully optimize the DTFW analysis (in other words, the features cannot be broken down any further), it is to be understood that different vector pair arrangements, such as 2×2, may be utilized. DTFW analysis using 1×1 arrangements are preferred as such arrangements optimize the "stretching and shrinking" of the DTFW analysis. However, it is to be understood that if fewer analyses are desired so as to, for example, decrease processing time, the number of features or the size of the vector pairs may be increased and/or decreased to achieve the desired results.

Figure 1B:
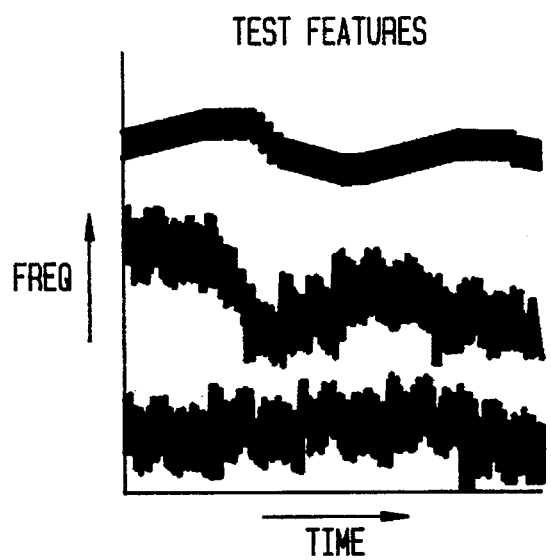
FIG. 1B is a graphical depiction of the test features of a single test utterance in the frequency and time domains.

The 1×1 vector pairs of step 120 are then sent through the DTW analysis of FIG. 4 so that an N×M score matrix may be constructed from DTW least distance score values in step 130. From these least distance score values, a least distance path and least distance score may be achieved using dynamic programming techniques in step 140. Accordingly, the DTFW analysis achieves an output of a least distance path and a least distance score in step 150, which are utilized to reorient the test features of FIG. 1B to the DTFW warped features of FIG. 3.

Accordingly, the overall DTFW system achieves or results in (1) a three-dimensional path (a frequency path) for each and every frequency vector (N or M number of paths), (2) a single time path, and (3) a threshold or total score. The threshold or total score should be equal to or less than the DTW score or path. In other words, at worst, DTFW achieves a linear frequency path (which is the DTW path).

From this overall path and score, the DTFW results may be compared to a model path and/or a pre-determined threshold in deciding whether to verify the identity of a speaker, recognize particular words or sounds, and/or normalize channels, among other uses. The model path is derived from known comparisons under similar and different channel characteristics and/or in different speaker situations (e.g. 1 speaker or multiple speakers). With regard to channel normalization, it is often difficult to verify the identity of a speaker or recognize particular words which are transmitted over the many different types of telephones and telephone lines in use today. The characteristics associated with different channels yield frequency shifts. In view of this difficulty, the use of the time/frequency warping function of the present invention can be valuable in normalizing these various different channel configurations resulting from the different telephones and telephone lines used today to enhance speaker verification and speech recognition, among other reasons. For example, from an analysis of consistent changes in frequency between two types of channels, the type of telephone and telephone lines in use can be determined. Moreover, by classifying the warped paths, a determination of whether the frequency warping is due to channel differences or speaker differences may be made. Classification of such warped paths may, for example, involve a comparison of the warped path to a model path.

In general, there are five ways to compare the results to achieve these uses. In the first manner, an analysis of the warped path in the frequency domain may determine how much the features were warped to determine whether or not the identity of the speaker is verified, speech recognized, etc. In a second type of analysis of the result, the difference of scores may be compared to classical DTW results to determine whether or not significant warping occurred. For example, if significant warping occurred, the identity of a person can be likely verified by the results of the DTFW analysis. In a third type of comparison, the minimum distance score for DTFW can be used as a threshold to facilitate speaker verification, speech recognition and channel normalization, among other uses. In a fourth type of analysis, the difference of scores may be compared to classical DTW results along with an analysis of the warped path in the frequency domain to determine whether significant warping occurred. In a fifth type of comparison, the minimum distance score for DTFW can be used as a threshold along with an analysis of the warped path in the frequency domain to achieve speaker verification, speech recognition, channel normalization, among other uses.

Figure 6:
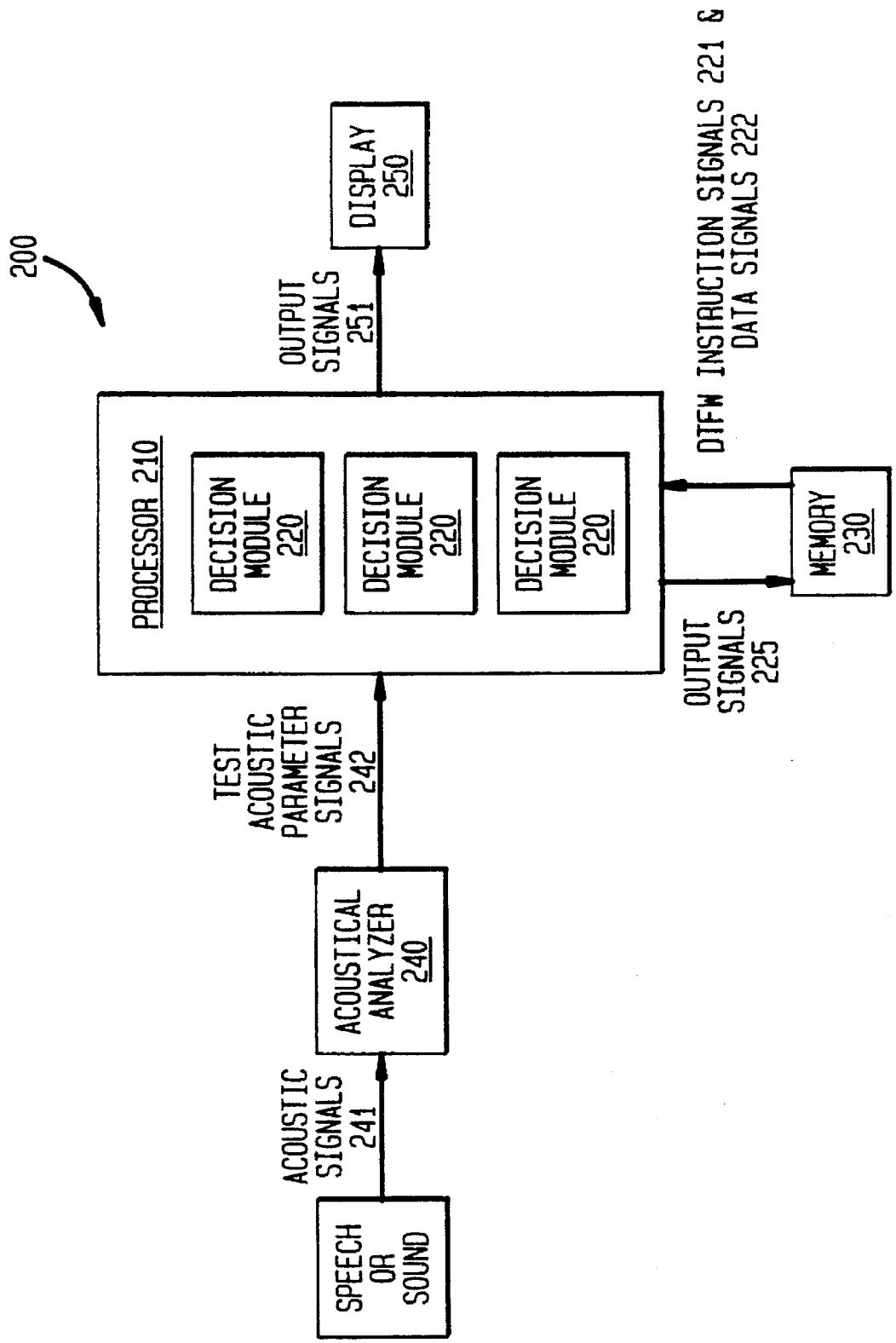
FIG. 6 is a flowchart depicting the structure utilized in implementing the dynamic time frequency warping techniques of the instant invention.

FIG. 6 is directed to the overall system 200 which represents the acoustical analysis system of the present invention. System 200 includes a computer structure governed by signals representing each of the vectors, matrixes, variables, etc. in the DTFW analysis (i.e., M, N, D, least distance score, least distance path, etc.). The DTFW analysis can be represented as acoustic signals and acoustic signal parameters which are analyzed by decision modules 220 within processor 210. Decision modules 220 receive DTFW instruction signals 221 and other data signals 222 from a memory 230. DTFW instruction signals 221 may include other signals such as speaker verification signals, sound recognition signals and channel normalization signals to achieve speaker verification, sound recognition and channel normalization, respectively. Decision modules 220 also generate output signals 225. Memory 230 comprises memory cell locations which contain DTFW signals 221 corresponding to DTFW instructions for analyzing two utterances, and output signals 225. In the preferred embodiment, the processor of the instant invention is an Intel® 486 processor, although it is to be understood that other types of processors, such as the Intel® 386, Pentium® etc., may also be utilized. Moreover, although only one processor is preferably used to implement DTFW analysis, it is to be understood that multiple processors may also be used.

Processor 210 may be used to perform various functions in implementing DTFW analysis. Those functions include, but are not limited to, the following: comparing test acoustic parameters signals with reference acoustic parameter signals, generating warped test acoustic parameter signals in the time and frequency domains, comparing warped test acoustic parameter signals to reference acoustic parameter signals, determining a difference between the warped test acoustic parameter signals and the reference acoustic parameter signals, comparing the difference to a threshold signal, verifying a source of the test acoustic parameter signals from the comparison of the difference to a threshold signal, recognizing a particular sound from the test acoustic parameter signals based on the comparison of the difference to the threshold signal, normalizing audio channels by the comparison of the difference to the threshold signal, generating Euclidean distance measurement signals in the time domain from the template acoustic parameter signals and the test acoustic parameter signals, generating a least distance path signal from the Euclidean distance measurement signals, generating a least distance score signal from the Euclidean distance measurement signals, generating transposed signals corresponding to the test acoustic parameter signals, generating from the transposed signals and the reference acoustic parameter signals a plurality of least distance path signals and least distance score signals by dynamic time warping, generating a least distance score signal and a least distance path signal from the plurality of least distance path signals and least distance score signals, comparing a model path signal with the difference signal, etc.

The overall system 200 also includes an acoustical analyzer 240. In the preferred embodiment, the analyzer 240 of the instant invention is preferably a telephone, although other analyzers which preferably include an analog to digital (A/D) converter may be utilized. Analyzer 240 could be used to perform various functions including digitization, endpoint detection, LPC analysis, among others. In general, analyzer 240 is used to receive acoustic signals 240 and generate test acoustic parameter signals 242 from the acoustic signals 241.

The overall system 200 may also include a display 250 which receives output signals 251 for graphically depicting the results of the DTFW analysis (such as that shown in FIG. 3) including decisions regarding speaker verification, speech recognition, channel normalization, etc.

Although a computer system and computer software are preferably used to implement the DTFW analysis of the instant invention, other systems, including the use of circuitry designed to perform DTFW, may be utilized.

The many features and advantages of the invention are apparent from the detailed specification, and thus, it is intended by the appendant claims to cover all such features and advantages of the invention which fall within the true spirit and scope of the invention. Further, since numerous modifications and variations will readily occur to those skilled in the art, it is not desired to limit the invention to the exact instruction and operation illustrated and described, and accordingly, all suitable modifications and equivalents may be resorted to, falling within the scope of the invention.

What is claimed is:

1. A method of analyzing acoustic signals, comprising the steps of:

receiving acoustic signals;

generating test acoustic parameter signals from said acoustic signals;

comparing said test acoustic parameters signals with reference acoustic parameter signals; generating warped test acoustic parameter signals in the time and frequency domains;

comparing said warped test acoustic parameter signals to said reference acoustic parameter signals;

determining a difference between said warped test acoustic parameter signals and said reference acoustic parameter signals;

generating a difference signal corresponding to said determined difference;

generating a model path signal;

comparing said model path signal with said difference signal; and verifying a source of said test acoustic parameter signals from said comparison of said model path signal with said difference signal.

2. A method of analyzing acoustic signals, comprising the steps of:

receiving acoustic signals;

generating test acoustic parameter signals from said acoustic signals;

comparing said test acoustic parameters signals with reference acoustic parameter signals;

generating warped test acoustic parameter signals in the time and frequency domains;

comparing said warped test acoustic parameter signals to said reference acoustic parameter signals;

determining a difference between said warped test acoustic parameter signals and said reference acoustic parameter signals;

generating a difference signal corresponding to said determined difference;

generating a model path signal;

comparing said model path signal with said difference signal; and recognizing a particular sound from said test acoustic parameter signals based on said comparison of said model path signal with said difference signal.

3. A method of analyzing acoustic signals, comprising the steps of:

receiving acoustic signals;

generating test acoustic parameter signals from said acoustic signals;

comparing said test acoustic parameters signals with reference acoustic parameter signals;

generating warped test acoustic parameter signals in the time and frequency domains;

comparing said warped test acoustic parameter signals to said reference acoustic parameter signals;

determining a difference between said warped test acoustic parameter signals and said reference acoustic parameter signals;

generating a difference signal corresponding to said determined difference;

generating a model path signal;

comparing said model path signal with said difference signal; and normalizing audio channels by said comparison of said model path signal with said difference signal.

4. A method of analyzing acoustic signals, comprising the steps of:

receiving acoustic signals;

generating test acoustic parameter signals from said acoustic signals;

comparing said test acoustic parameters signals with reference acoustic parameter signals;

generating warped test acoustic parameter signals in the time and frequency domains;

comparing said warped test acoustic parameter signals to said reference acoustic parameter signals;

determining a difference between said warped test acoustic parameter signals and said reference acoustic parameter signals;

generating a difference signal corresponding to said determined difference;

determining a warped path from said warped test acoustic parameter signals; and classifying said warped path to determine whether frequency warping is due to channel differences or speaker differences.

5. A method of analyzing acoustic signals, comprising the steps of:

receiving acoustic signals;

generating test acoustic parameter signals from said acoustic signals;

comparing said test acoustic parameters signals with reference acoustic parameter signals;

generating warped test acoustic parameter signals in the time and frequency domains;

comparing said warped test acoustic parameter signals to said reference acoustic parameter signals;

determining a difference between said warped test acoustic parameter signals and said reference acoustic parameter signals;

generating a difference signal corresponding to said determined difference;

comparing said difference signal to a threshold signal; and verifying a source of said test acoustic parameter signals from said comparison of said difference signal to said threshold signal.

6. A method of analyzing acoustic signals, comprising the steps of:

receiving acoustic signals;

generating test acoustic parameter signals from said acoustic signals;

comparing said test acoustic parameters signals with reference acoustic parameter signals;

generating warped test acoustic parameter signals in the time and frequency domains;

comparing said warped test acoustic parameter signals to said reference acoustic parameter signals;

determining a difference between said warped test acoustic parameter signals and said reference acoustic parameter signals;

generating a difference signal corresponding to said determined difference;

comparing said difference signal to a threshold signal; and recognizing a particular sound from said test acoustic parameter signals based on said comparison of said difference signal to said threshold signal.

7. A method of analyzing acoustic signals, comprising the steps of:

receiving acoustic signals;

generating test acoustic parameter signals from said acoustic signals;

comparing said test acoustic parameters signals with reference acoustic parameter signals;

generating warped test acoustic parameter signals in the time and frequency domains;

comparing said warped test acoustic parameter signals to said reference acoustic parameter signals;

determining a difference between said warped test acoustic parameter signals and said reference acoustic parameter signals;

generating a difference signal corresponding to said determined difference;

comparing said difference signal to a threshold signal; and normalizing audio channels by said comparison of said difference signal to said threshold signal.

8. A method of analyzing acoustic signals, comprising the steps of:

receiving acoustic signals;

generating test acoustic parameter signals from said acoustic signals;

comparing said test acoustic parameters signals with reference acoustic parameter signals;

generating warped test acoustic parameter signals in the time and frequency domains;

comparing said warped test acoustic parameter signals to said reference acoustic parameter signals;

determining a difference between said warped test acoustic parameter signals and said reference acoustic parameter signals;

generating a difference signal corresponding to said determined difference;

generating Euclidean distance measurement signals in the time domain from said reference acoustic parameter signals and said test acoustic parameter signals;

generating a least distance path signal from said Euclidean distance measurement signals; and generating a least distance score signal from said Euclidean distance measurement signals.

9. The method of claim 2 wherein said warping step further comprises the dynamic time/frequency warping steps of:

generating transposed signals corresponding to said test acoustic parameter signals;

generating from said transposed signals and said reference acoustic parameter signals a plurality of least distance path signals and least distance score signals by dynamic time warping; and generating a least distance score signal and a least distance path signal from said plurality of least distance path signals and least distance score signals.

* * * * *